(12) United States Patent
Hannig et al.

(10) Patent No.: US 12,325,167 B2
(45) Date of Patent: Jun. 10, 2025

(54) METHOD FOR PRODUCING A DECORATIVE WALL- OR FLOOR PANEL

(71) Applicant: AKZENTA PANEELE + PROFILE GMBH, Kaisersesch (DE)

(72) Inventors: Hans-Jürgen Hannig, Bergisch Gladbach (DE); Egon Hoff, Mastershausen (DE); Felix Hüllenkremer, Koblenz (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 119 days.

(21) Appl. No.: 17/782,816

(22) PCT Filed: Sep. 25, 2020

(86) PCT No.: PCT/EP2020/076866
§ 371 (c)(1),
(2) Date: Jun. 6, 2022

(87) PCT Pub. No.: WO2021/115653
PCT Pub. Date: Jun. 17, 2021

(65) Prior Publication Data
US 2023/0018307 A1     Jan. 19, 2023

(30) Foreign Application Priority Data
Dec. 11, 2019    (EP) .................................... 19215216

(51) Int. Cl.
*B29C 48/00*     (2019.01)
*B29C 48/07*     (2019.01)
(Continued)

(52) U.S. Cl.
CPC ...... *B29C 48/0023* (2019.02); *B29C 48/0011* (2019.02); *B29C 48/07* (2019.02);
(Continued)

(58) Field of Classification Search
CPC ..... B29C 43/24; B29C 43/52; B29C 48/2023; B29C 48/35
See application file for complete search history.

(56) References Cited

U.S. PATENT DOCUMENTS

2013/0307179 A1* 11/2013 Roth ...................... B29C 43/24
                                                                      425/170
2017/0165881 A1* 6/2017 Shinobudani ......... B29C 43/245
(Continued)

FOREIGN PATENT DOCUMENTS

CN        106985408 A     7/2017
CN        107186937 A     9/2017
(Continued)

OTHER PUBLICATIONS

Notice of Rejection regarding Korean Application No. 10-2022-7014869, dated Nov. 6, 2024.

*Primary Examiner* — Edmund H Lee
(74) *Attorney, Agent, or Firm* — Harness, Dickey & Pierce, P.L.C.

(57) ABSTRACT

The present disclosure relates to a method for producing a decorative wall- or floor panel, having the method steps: •a) providing a melted polymer mass; •b) extruding the molten polymer mass through a nozzle; •c) finish-sizing the molten polymer mass to form a panel-like carrier material by means of an assembly of multiple rotatable rolls, wherein the individual rolls are disposed one above the other or one behind the other and each individual roll forms at least one finish-sizing nip with neighbouring rolls, through which nip the melted polymer mass is passed, and wherein the finishing nip heights can be variably adjusted by a horizontal and/or vertical movement of individual rolls during the production process; •d) applying a decor pattern that imitates a decor template to at least one sub-region of the at least (Continued)

partly finish-sized carrier material, and •e) applying a protective coating to at least one sub-region of the decor.

5 Claims, 5 Drawing Sheets

(51) Int. Cl.
| | |
|---|---|
| *B29C 48/35* | (2019.01) |
| *B29C 48/92* | (2019.01) |
| *B32B 27/08* | (2006.01) |
| *B32B 27/20* | (2006.01) |
| *B32B 27/36* | (2006.01) |
| *B29C 43/46* | (2006.01) |
| *B29K 67/00* | (2006.01) |
| *B29L 7/00* | (2006.01) |

(52) U.S. Cl.
CPC .............. *B29C 48/35* (2019.02); *B29C 48/92* (2019.02); *B32B 27/08* (2013.01); *B32B 27/20* (2013.01); *B32B 27/36* (2013.01); *B29C 2043/467* (2013.01); *B29C 2795/007* (2013.01); *B29C 2948/92704* (2019.02); *B29C 2948/92923* (2019.02); *B29K 2067/003* (2013.01); *B29L 2007/002* (2013.01); *B32B 2250/42* (2013.01); *B32B 2255/10* (2013.01); *B32B 2255/26* (2013.01); *B32B 2264/107* (2013.01); *B32B 2272/00* (2013.01); *B32B 2607/00* (2013.01)

(56) References Cited

U.S. PATENT DOCUMENTS

| | | | |
|---|---|---|---|
| 2017/0182685 A1* | 6/2017 | Xu | ................. B29C 48/914 |
| 2018/0272796 A1 | 9/2018 | Hannig | |
| 2019/0016024 A1* | 1/2019 | Zhou | ................. B29C 43/24 |
| 2019/0292793 A1 | 9/2019 | Van Vlassenrode et al. | |

FOREIGN PATENT DOCUMENTS

| | | |
|---|---|---|
| CN | 107738394 A | 2/2018 |
| CN | 108025588 A | 5/2018 |
| DE | 102011003604 A1 | 8/2012 |
| DE | 202016101306 U1 | 4/2016 |
| EP | 3140129 B1 | 7/2018 |
| KR | 10-2016-0149306 A | 12/2016 |
| KR | 10-2019-0073480 A | 6/2019 |
| KR | 10-2019-0087678 A | 7/2019 |

* cited by examiner

METHOD FOR PRODUCING A DECORATIVE WALL- OR FLOOR PANEL

CROSS-REFERENCE TO RELATED APPLICATIONS

This application is a U.S. National Phase Application under 35 U.S.C. 371 of International Application No. PCT/EP2020/076866, filed on Sep. 25, 2020, which claims the benefit of European Patent Application No. 19215216.3, filed on Dec. 11, 2019. The entire disclosures of the above applications are incorporated herein by reference.

FIELD

The present disclosure relates to a method for producing a decorated wall or floor panel, comprising the method steps of
a) providing a melted polymer mass;
b) extruding the melted polymer mass through a die;
c) finish-sizing the melted polymer mass to form a plate-like carrier by means of an assembly of a plurality of rotatable rollers, wherein the individual rollers are arranged one above the other or one behind one another and each individual roller forms at least one finish-sizing nip with adjacent rollers through which nip the melted polymer mass is passed, and wherein the finish-sizing nip heights can be variably adjusted by a horizontal and/or vertical movement of individual rollers during the production process;
d) applying a decoration imitating a decoration template onto at least one sub-region of the at least partially finish-sized carrier, and
e) applying a protective coating onto at least one sub-region of the decoration.

BACKGROUND

This section provides background information related to the present disclosure which is not necessarily prior art.

It is also an object of the present disclosure to provide a device for producing a decorated wall or floor panel, as well as a wall or floor panel produced according to the method described above.

Decorated boards are known per se and are used, for example, in interior design as floor or wall coverings. The term wall panel is also understood to mean panels, which are suitable for ceiling cladding. The panels usually consist of a carrier or core made of a solid material, for example a wood material, which is provided on at least one side with a decorative layer and a top layer and optionally with further layers, for example a wear layer arranged between the decorative layer and the top layer. The decorative layer is usually a printed paper impregnated with a resin. The top layer and the other layers are usually made of resin, too.

Methods for producing panels usually comprise several method steps. For example, a "cake" of granulate pellets can be applied onto the lower belt of a press via a spreading machine. In the course of production, this cake is usually fed into a hot belt press with steel and/or Teflon belts, in which the heating and melting of the granulate pellets takes place. Simultaneously with the melting, the material can be pressed and formed into the shape of a carrier. Subsequently, controlled cooling results in a solidification or crystallization of the carrier material, wherein the waste heat remains largely unused because the usable temperature difference due to the controlled cooling is too small for any other use. The heat transfer in this belt press process is effected from above and below by contact with the press. Moreover, for cooling it is disadvantageous that the heat must pass through the glass-fiber-reinforced Teflon belt. Only then the heat transfer takes place via heat conduction into the granulate fill or the carrier material. These physical processes are very slow because the pellet cake initially still contains air from the pellet fill, which, from the point of view of product physics, may only slowly be pressed out of the carrier. In order to achieve acceptable belt speeds during the production, a high temperature gradient must be applied for cooling, which leads to considerable waste heat losses.

A possible method for producing a decorated wall or floor panel is described for example in EP3140129 B1. The method comprises the method steps:
a) providing a pourable carrier material, in particular a granulate;
b) placing the carrier material between two belt-like conveying means;
c) forming the carrier material under the action of temperature to form a web-like carrier;
d) compressing the carrier;
e) treating the carrier under the action of pressure by use of a two-belt press, wherein the carrier is cooled within or upstream of the two-belt press;
f) optionally further cooling of the carrier;
g) optionally applying a decoration subsurface onto at least one sub-region of the carrier;
h) applying a decoration imitating a decoration template onto at least one sub-region of the carrier;
i) applying a protective coating onto at least one sub-region of the decoration;
j) optionally structuring the protective coating for introducing pores and/or structuring the edge region of the carrier to form connecting elements; and
k) optionally treating the carrier for electrostatic discharge prior to any of the aforementioned method steps.

The manufacture of panels may offer further potential for improvement.

SUMMARY

This section provides a general summary of the disclosure, and is not a comprehensive disclosure of its full scope or all of its features.

It is therefore the object of the present disclosure to provide an improved method for producing decorated wall or floor panels.

The disclosure thus proposes a method for producing a decorated wall or floor panel, comprising the method steps:
a) providing a melted polymer mass;
b) extruding the melted polymer mass through a die;
c) finish-sizing the melted polymer mass to form a plate-like carrier by means of an assembly of a plurality of rotatable rollers, wherein the individual rollers are arranged one above the other or one behind the other and each individual roller forms at least one finish-sizing nip with adjacent rollers through which nip the melted polymer mass is passed, wherein the finish-sizing nip heights can be variably adjusted by means of a horizontal and/or vertical movement of individual rollers during the production process;
d) applying a decoration imitating a decoration template onto at least one sub-region of the at least partially finish-sized carrier; and
e) applying a protective coating onto at least a sub-region of the decoration.

Surprisingly, it was found that the above-described method enables an improved production of a wall or floor panel. By aggregating the method steps, high-quality panels with improved decorative properties can be obtained within very short process times. Due in particular to the finish-sizing step according to the disclosure, the panels have particularly even carrier surfaces onto which high-quality decorations can be applied particularly efficiently. Without being bound by theory, decorations applied according to the disclosure exhibit particularly high-quality optical properties due to the particular smooth and defect-free surface of the carrier material. The above-mentioned approach also enables a high throughput with high web speeds and reduces the proportion of non-conforming panels. In particular, the integration of the roller finish-sizing step into the production process according to the disclosure allows to reduce the percentage of air inclusions at the panel surface, which can probably be attributed to an improved removal of air present in the carrier as well as an improved exclusion of air in the roller nips. In addition to the direct process advantages, the flexible process by use of individually controllable rollers can also reduce the setup and run-in times of the plant, which results in a higher process efficiency. Furthermore, a larger proportion of process energy can be recovered via the finish-sizing sub-step according to the disclosure, which contributes overall to a smaller $CO_2$ footprint of the process used and thus also of the panel produced.

The method according to the disclosure is a method for producing a decorated wall or floor panel. In the sense of the disclosure, the term "decorated wall or floor panel" or "decorative panel" means, in particular, wall, ceiling or floor panels which comprise a decoration applied to a carrier plate and imitating a decorative template. Here, decorative panels are used in a variety of ways both in the field of interior design of rooms and for decorative cladding of buildings, for example in exhibition stand construction. One of the most common fields of application of decorative panels is their use as a floor covering. The decorative panels often have a decoration that is intended to imitate a natural material.

Examples of such imitated natural materials or decoration templates include wood species such as maple, oak, birch, cherry, ash, walnut, chestnut, wenge or even exotic woods such as panga-panga, mahogany, bamboo and bubinga. In addition, natural materials such as stones or ceramics can be replicated.

Accordingly, in the sense of the present disclosure the term a "decorative template" can be understood to mean in particular that such a natural material or at least its surface is to be imitated or simulated by the decoration.

Method step a) comprises providing a melted polymer mass. The melted polymer mass exhibits, at least in part, the properties of a flowable viscous liquid and can be obtained, for example, by a thermal treatment step of polymers usually present as granulates. Here, the melted polymer mass can consist of only one homogeneous polymer mass or of several polymer masses which are mixed with one another or are present in a defined form layered one on top of the other (feed block). "Granulate" or "granular material" can be understood to mean a solid or an aggregate of a solid comprising or consisting of a plurality of solid particles, such as grains or spheres. By way of example, but not exhaustively, granular or powdery materials may be mentioned here, or suitable recycled materials present as ground materials.

The polymer mass or the granulate may comprise a carrier material based on a plastic, a compound based on inorganic fillers, or a wood-plastic composite (WPC) material. For example, the melted polymer mass, and thus also the carrier plate can essentially be formed from a thermoplastic, elastomeric or thermosetting plastic. Furthermore, recycled materials made of the aforementioned materials can be used in the frame of the method according to the disclosure. Here, preferably, thermoplastics such as in particular polyvinyl chloride, polyolefins (for example polyethylene (PE), polypropylene (PP)), polyamides (PA), polyurethanes (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymers thereof can be used as a melted polymer mass. For example, plasticizers can be provided independently of the base material of the carrier, which can be present for example in a range from $\geq 0$ wt.-% to $\leq 20$ wt.-%, in particular $\leq 10$ wt.-%, preferably $\leq 7$ wt.-%, for example in a range from $\geq 5$ wt.-% to $\leq 10$ wt.-%. Suitable plasticizers include, for example, the plasticizer sold under the trade name "Dinsch" marketed by BASF. Furthermore, copolymers such as acrylates or methacrylates or blends with thermoplastic elastomers (TPEs) can be provided as substitutes for conventional plasticizers.

In order to produce a melted polymer mass, one or more so-called dry blends can be melted, for example, i.e. dry plastic powders with additives. Additives may include, for example, "fiber materials" such as paper and nonwovens based on plant, animal, mineral, or even artificial fibers or cardboards. Examples are fiber materials made from plant fibers and, in addition to papers and nonwovens made from cellulose fibers, plates made from biomass such as straw, maize straw, bamboo, leaves, algae extracts, hemp, cotton or oil palm fibers. Examples of animal fiber materials include keratin-based materials such as wool or horsehair. Examples of mineral fiber materials include those made from mineral wool or glass wool.

These materials can be provided in method step a), for example, by a screw extruder, in which the polymeric material or the dry blends are melted by means of pressure, temperature and shear forces, optionally homogenized and passed to method step b).

In method step b), the melted polymer mass is extruded through a die. The melted and plasticized polymer mass is forced through a die by means of pressure, wherein suitably a part of the final product geometry is already predetermined by the choice of the die geometry. For panels, the choice of a slot die or a wide-slot die has proved to be particularly suitable, which has a ratio of slot width to slot height of more than approximately 4:1 (width:height), preferably more than 10:1, and further preferably more than 20:1. In particular for the panels according to the disclosure, this rather wide and narrow die geometry already allows a large part of the carrier structure to be preformed, so that the subsequent effort required for finish-sizing the extruded polymeric mass can be kept small. In particular, it may be advantageous for the wide slot die to have means for adjusting the die nip. These means can be used, for example, to extremely flatten the edge areas of the extruded flat strand, so that flatter joints between different panels compared with average panel thicknesses can be formed in these edge areas in a further method step without major finish-sizing effort.

In method step c), the melted polymer mass is finish-sized while forming a plate-shaped carrier by means of an assembly of several rotatable rollers, wherein the individual rollers are arranged one above the other or one behind the other and each individual roller forms at least one finish-sizing nip with adjacent rollers through which nip the melted polymer mass is passed, wherein the finish-sizing nip heights can be variably adjusted by means of a horizontal or vertical movement of individual rollers during the production process. In contrast to the state of the art, forming and finish-sizing of the panels is not carried out by use of a plane press, but by use of rollers. The melted polymeric mass is passed through the nips between the rollers formed by the roller assembly, and due to the mechanical stress in the roller nips, the mass is squeezed and brought to the desired thickness. In addition to the mechanical forces applied by the rollers, the polymeric mass can also simultaneously be cooled. This can be done via the rollers or by means of other cooling means, e.g. by blowing air. The fact that efficient finish-sizing can be obtained by means of the roller assembly and by means of the roller nips is surprising, since the viscoelastic properties of the melted polymeric mass rather suggest the use of presses with a large surface area. The rather small active finish-sizing surface in the roller nips compared to the presses should rather result in that due to the rheological properties of the polymer mass, such as thixotropic properties, only an insufficient finish-sizing is obtained at small finish-sizing surfaces. Surprisingly, however, this is not the case, so that an efficient and time-saving production can be ensured via the assembly of a plurality of rollers. A plurality of rollers in this context means more than four, for example five rollers, wherein the plurality of rollers form at least 3 or 4 separate nips. The nips are preferably arranged one behind the other, separated by the rollers. In particular, according to the disclosure, it is also provided that the finish-sizing of the carrier is carried out only by passing the melted carrier material through the roller nips. In this respect, it can also be provided according to the disclosure that the method can completely dispense with the use of plate-shaped pressing devices, such as belt presses. It can also be provided that the finish-sizing of the carriers is only carried out by the rollers arranged one behind the other in direct succession at one location of the device. In this case, a division of the roller assembly, for example first two roller nips, followed by, for example, a cooling section and then again one or two roller nips, would not be in accordance with the disclosure in this case. According to the disclosure, it can further be provided that the finish-sizing takes place directly after the extrusion of the carrier material and that further significant finish-sizing or smoothing steps are omitted.

The finish-sizing nip heights can be variably adjusted by moving individual rollers horizontally or vertically during the manufacturing process. This means that a change in the position of an individual roller also changes the nip dimensions of the nip or nips formed to adjacent rollers. In this way, the nip dimensions and thus the carrier height can be influenced by the distance between the rollers. Moreover, via the relative height of the individual rollers relative to one another the pull-off angle or angle of incidence of the melted polymer material from or on the roller can be changed, which can result in different mechanical forces, possibly different cooling properties and areas, as well as possible air inclusions between the roller and the polymer. A roller is variably adjustable during the manufacturing process if the roller can change its X and/or Y position while the polymer material passes therethrough. The individual nips can be controlled either isobarically or isochorically during the manufacturing process. The former mode of operation results in a mechanical force on the polymeric carrier material in the nip, whereas the latter mode of operation is based on a constant thickness of the nip between two rollers. Thus, in the former mode of operation, the roller positions are dynamically adjusted, whereas in the latter the roller positions are kept rather constant relative to each other.

It is particularly advantageous if different finish-sizing nips can be set between several or all rollers. This can counteract fluctuations in the carrier thickness occurring during production and possibly a not completely homogeneous cooling performance of the individual rollers. Each of the rollers can simply co-run or support the conveying of the film, which is why it can also be provided that the rollers can be driven individually or together. Depending on the roller positioning, the carrier material can pass through the roller in a quasi wavy line and thus comes into contact once with one side and once with the other side of successive rollers. In order to ensure that the influence of the contact areas between roller and carrier surface is essentially the same for both sides of the carrier, it can be provided that the diameter of the main rollers and the downstream rollers is selected such that the contact surfaces between carrier and rollers are essentially the same on both sides of the carrier. When passing around a respective roller, only one side of the extrudate can be cooled at a time, which may cause stresses in the plate. In order to counteract this uneven cooling profile, for example, the rear side can be actively cooled by introducing cold air (e.g. airknife) to achieve a more uniform cooling effect on the carrier.

Since the cooling behavior may vary across the width of the extrudate and in order to counteract a neck-in effect, it is also possible to work with heat in the edge area on the opposite side. IR emitters, for example, can be used for this purpose. Further measures for uniform cooling the molded polymer mass can be vacuum boxes, which ensure air-free application of the polymer melt onto the roll, or so-called edge pinning, in which the edge area is fixed electrostatically on the roll.

In method step d), a decoration reproducing a decorative template is applied onto at least a sub-region of the at least partially finish-sized carrier. The application of the decoration template can therefore be carried out at the finish-sized carrier after it has passed through the roller assembly or before it has passed through the last roller finish-sizing nip. By means of the method according to the disclosure, the carrier not only has a particularly smooth surface with low roughness, but also a surface with particularly few air inclusions. These two factors can contribute to a particularly reproducible and high-quality decorated carrier end product. Without being bound by theory, due to the relatively small volume in the roller nip between the pairs of rollers, the air in the carrier can escape much better compared to a flat press. This can lead to carriers and carrier surfaces with particularly low air inclusions. By means of a second introduced white colored polymer melt on the upper side of the melted and extruded polymer, a smooth, void-free printing subsurface can be applied, which, contrary to the solutions from the prior art, does not have to be coated with thermosets not based on a polymer. Here, the advantage is that this consists of an almost identical thermoplastic polymer matrix of the carrier plate. The latter can be very advantageous for efficient recycling.

Furthermore, a decoration reproducing a decoration template is applied onto at least a sub-region of the carrier. Here, the decoration can be applied, for example, by so-called direct printing. In the sense of the disclosure, the term "direct printing" is understood to mean the application of a decoration directly onto the carrier of a panel or onto a non-printed fiber material layer applied onto the carrier or to a decorative subsurface. Different printing techniques can be used, such as flexographic printing, offset printing or screen printing. In particular, inkjet or laser printing processes, for example, can be used as digital printing techniques.

For example, in order to imitate or reproduce a decoration template in three-dimensional form in a particularly detailed and highly accurate manner, the decoration can be applied in a manner identical to the original after passing the roller assembly. In particular, the three-dimensional decoration data can be provided by three-dimensional scanning of the decoration template by means of electromagnetic radiation, for example by a three-dimensional scanner (3D scanner). Here, a plurality of decoration layers with at least partially different surface applications can be successively applied on the basis of the three-dimensional decoration data provided.

Furthermore, the decorative layers can be formed from an in particular radiation-curable paint and/or ink. For example, a UV-curable paint or ink may be used. In this embodiment, a particularly detailed and matching reproduction of the decoration template can be achieved. On the one hand, a synchronous pore can be achieved with high precision in this way without the provision of further measures. Here, a synchronous pore can be, in particular, a pore or another type of structure that is spatially arranged exactly where it is optically represented by a haptic structuring that corresponds to the optical decoration features. This is essentially automatically the case in this embodiment, since the structural design is generated precisely by the paint or ink. In addition, decoration templates, such as wood-based materials, often exhibit a variation of the color impression not only along their width or length but also along their depth. This color impression or color gradient, too, can be reproduced particularly detailed in this embodiment, which also makes the overall appearance of the panel even more identical. Thus, in particular if the paint or ink used is radiation-curable, a particularly fast solidification can be achieved, whereby the plurality of layers can be applied onto one another quickly, which can also make the overall process feasible in a shorter time and thus particularly cost-effective.

In the sense of the disclosure, the term radiation-curable paint is understood to mean a composition comprising a binder and/or filler as well as color pigments, which can be at least partially polymerized induced by electromagnetic radiation of a suitable wavelength, such as UV radiation or electron radiation.

Accordingly, in the sense of the disclosure the term radiation-curable ink is understood to mean an essentially filler-free composition comprising color pigments, which can be at least partially polymerized induced by electromagnetic radiation of a suitable wavelength, such as, for example, UV radiation or electron radiation.

Here, the decorative layers can be applied in thicknesses from ≥5 μm to ≤10 μm.

It is also possible to apply a corresponding negative image of the decoration template in addition to a positive image in terms of color and/or structure. In detail, as is known, for example, from positive or negative staining for wood-based materials, the color impression for example of a texture can be reversed by the use of digital data, so that a negative is obtained with regard to the color or, in particular, lighter and darker areas. The same is possible not only for the color impression but also for the applied structure, so that a negative can also be realized with regard to the structural design. Such effects, too, can also be easily integrated into a production process on the basis of digital three-dimensional data and without lead times or conversions.

In method step e), a protective coating is applied onto at least a sub-region of the decoration. Such a layer for protecting the applied decoration can be applied in particular as a wear or top layer above the decorative layer in a subsequent method step and in particular protects the decorative layer from wear or damage due to dirt, the influence of moisture or mechanical influences such as abrasion. For example, it may be provided that the wear and/or top layer is laid as a pre-produced overlay layer, for example based on melamine, onto the printed carrier and bonded thereto by the action of pressure and/or heat. It may also be preferred that for the formation of the wear and/or top layer, a radiation-curable composition, for example a radiation-curable coating, such as an acrylic coating, is applied. Here, it may be provided that the wear layer comprises hard materials such as titanium nitride, titanium carbide, silicon nitride, silicon carbide, boron carbide, tungsten carbide, tantalum carbide, aluminum oxide (corundum), zirconium oxide or mixtures thereof in order to increase the wear resistance of the layer. In this regard, the coating can be applied, for example, by means of rollers, such as rubber rollers, or by means of pouring devices.

Furthermore, the top coat can be first partially cured and then a final coating with a urethane acrylate and a final curing, such as with a gallium emitter, can be carried out.

Furthermore, the top and/or wear layer may comprise means for reducing the static (electrostatic) charge of the final laminate. For example, it may be provided for this purpose that the top and/or wear layer comprises compounds such as choline chloride. In this regard, the antistatic agent may be present, for example, in a concentration between ≥0.1 wt.-% and ≤40.0 wt.-%, preferably between ≥1.0 wt.-% and ≤30.0 wt.-%, in the top and/or composition for forming the wear layer.

Likewise, a transparent wear layer of thermoplastic polymers may be appropriate, which is laminated as a film web onto the decorative layer. Optionally, for a sufficient adhesion use of an adhesion promoter/primer is necessary, which links with the decoration layer by radiation curing from above ("adhesive coating") or by thermally sealing ("hot melt"). A thermoplastic wear layer further offers advantages for the recycling process of the overall structure. A surface structuring can be very easily introduced by heated structured sheets via a press or structured rollers via a calender (these can also be synchronized with the decoration).

It may also be provided to introduce a structuring, in particular a surface structuring matching with the decoration, into the protective or wear and top layer, respectively, by introducing pores. In this case, it can be provided that the carrier plate already has a structuring and that an alignment of a printing tool for applying the decoration and the carrier plate relative to one another are carried out depending on the structuring of the carrier plate detected by optical methods. For the alignment of the printing tool and the carrier plate relative to each other, it can be provided that a relative movement between the printing tool and the carrier plate, which is necessary for the alignment, can be achieved by shifting the carrier plate or by shifting the printing tool. Furthermore, it can also be provided that a structuring of the decorative panels is carried out after application of the top and/or wear layer. For this purpose, it can preferably be provided that a curable composition is applied as a top and/or wear layer and that a curing process only takes place to the extent that only a partial curing of the top and/or wear layer takes place. A desired surface structure is embossed into the thus partially cured layer by means of suitable tools, such as a hard metal structure roller or a stamp during or after the finish-sizing step. In this case, the embossing is carried out in accordance with the applied decoration. In order to ensure a sufficient matching of the structure to be introduced with the decoration, it may be provided that the carrier plate and the embossing tool can be aligned relative to one another by appropriate relative movements. After the desired structure has been introduced into the partially cured top and/or wear layer, the now structured top and/or wear layer is further cured. In a further step, the carrier plate provided with a decoration can then be divided into individual panels by suitable mechanical processes. This can be done, for example, by cutting the extruded strand in regular distances or in regular time intervals. Preferably, cut panels of equal length can be produced by this method step.

In a preferred embodiment of the method, the finish-sizing in method step c) can be carried out by use of at least one main roller pair consisting of two rollers with larger diameter and at least three finish-sizing rollers arranged one behind the other with a smaller diameter compared that of the main roller pair. In order to obtain a surface structure that is as uniform as possible for receiving the decoration, it has proved particularly advantageous to apply mechanical and, if necessary, thermal forces to the carrier in a non-uniform manner by means of different roller sizes. This measure can lead to particularly smooth carrier surfaces, which can be provided with decorations particularly easily and reproducibly. Here, the main part of the desired and necessary deformation can be carried out by the larger pair of rollers, whereas the other, smaller finish-sizing rollers exert only small forces to obtain a uniformly finish-sized product and transport air out of the substrate in a controlled manner. In this way, high line speeds can be achieved while maintaining only slight thickness fluctuations of the produced carrier. The roller diameters differ in size if the corresponding diameters of the main and finish-sizing rollers differ by at least 10%. For example, the above assembly results in the following nip assemblies for the melted polymer material. Mandatory the melted polymer material passes through the nip between the main rollers, and at least the two nips between the at least three finish-sizing rollers. For example, the assembly may have a total of 8, preferably 6, further preferably 4 finish-sizing rollers. This number of individual nips has been found to be particularly suitable for obtaining decorated panels with improved surface and decoration properties.

Within a further embodiment of the method, the height of the finish-sizing nip of the main roller pair $H_H$ may differ by greater than or equal to 10% and less than or equal to 50% from the heights of the finish-sizing nips of the finish sizing rollers $H_K$. In order to obtain particularly smooth carrier surfaces and to obtain mechanically particularly low-stress carrier materials, the above-mentioned nip height ratio between the main and finish-sizing rollers has proved to be particularly suitable. The force acting on the carrier can be co-determined by this specification, so that a force distribution particularly suitable for the production of decorated panels is specified for the roller assembly. This results in particularly favorable properties both in terms of the presence of air inclusions and in terms of the occurrence of stress cracks in the carrier material. In addition, the distance of the exerted mechanical force for forming the carrier, in relation to the place of application of the decoration, also appears to play an important role. In this regard, it has been found to be particularly suitable in a preferred embodiment that the height of the finish sizing nip(s) is greater than or equal to 10% and less than or equal to 50% lower than the height of the main roller nip. This can result in high line speeds without loss of the surface quality of the decorated panel.

In a further aspect of the method, the height of the last and/or penultimate finish-sizing nip can be selected such that the carrier is compressed in its height by a factor of less than or equal to 10% and greater than or equal to 3%. In order to obtain particularly low air entrapment and particularly smooth carrier surfaces, the above-mentioned compression ratio has proved to be particularly advantageous. The ratio can be determined, for example, by measuring the thickness of the substrate before and after passing the nip. In this case, the desired compression ratio can be adjusted via the height profile ratio of the finish-sizing roller nips or also via the force to be applied in the individual roller nips.

In a further, preferred characteristic of the method, method step d) can additionally comprise the application of a decorative subsurface onto at least a sub-region of the carrier prior to the application of the decoration. At the same time or shortly before the application of the decorative layer or even already in the roller assembly, of course, further optional layers, such as a decoration subsurface or a primer layer, can be applied onto the carrier. It may be advantageous, for example, to apply these further layers onto the carrier upstream the last roll, since an improved adhesion of these further layer(s) to the carrier can be achieved by the at least one mechanical treatment in the further finish-sizing nip. Furthermore, the carrier can undergo a pre-treatment of the carrier by means of an electrostatic discharge between or downstream the roller assembly. This can serve in particular to prevent the occurrence of blurring in the course of the application of the decoration. This is in particular suitable for printing processes for applying the decorative layers, since the electrostatic charge that builds up in the carriers to be printed in the course of the production process results in a deflection of the paint or ink drops on their way from the print head to the surface to be printed. The inaccuracy of the paint or ink application caused thereby leads to the perceptible blurring of the printed image.

A possible device for discharging electrostatic charges can comprise at least one of the rollers or a separate roll, brush or lip made of a conductive material with a conductivity $\geq 1*3$ $Sm^{-1}$, which makes an electrically conductive contact with the carrier at least in the area of the printing unit and which is connected to an electrical mass potential. The electrical mass potential can be provided, for example, by grounding. Furthermore, a device for discharging electrostatic charges can be, for example, a device for generating a corona discharge.

A decoration subsurface may comprise, for example, first a primer, in particular for a printing process, for example in a thickness of $\geq 10$ µm to $\leq 60$ µm. In this context, as the primer a liquid radiation-curing mixture based on a urethane or a urethane acrylate, optionally with one or more of a photoinitiator, a reactive diluent, a UV stabilizer, a rheology agent such as a thickener, a radical scavenger, a levelling agent, a defoamer or a preserving agent, a pigment and/or a colorant may be used. For example, the urethane acrylate may be present in the primer composition in the form of reactive oligomers or prepolymers. In the sense of the disclosure, the term "reactive oligomer" or "prepolymer" is to be understood as a compound containing urethane acrylate units which can react into the urethane or urethane acrylate polymer radiation-induced, optionally with the addition of a reactive binder or a reactive diluent. Here, urethane acrylates in the sense of the disclosure are compounds which are essentially composed of one or more aliphatic structural elements and urethane groups. Aliphatic structural elements comprise both alkylene groups, preferably with 4 to 10 C atoms, and cycloalkylene groups, preferably with 6 to 20 C atoms. Both the alkylene and the cycloalkylene groups may be mono- or polysubstituted by $C_1$-$C_4$-alkyl, in particular by methyl, and may contain one or more non-adjacent oxygen atoms. The aliphatic structural elements are optionally bonded to one another by quaternary or tertiary carbon atoms, via urea groups, biureth, urethdione, allophanate, cyanurate, urethane, ester or amide groups or via ether oxygen or amine nitrogen. Furthermore, urethane acrylates in the sense of the disclosure can also comprise ethylenically unsaturated structural elements. These are preferably vinyl or allyl groups which may also be substituted with $C_1$-$C_4$-alkyl, in particular methyl, and which are derived in particular from α,β-ethylenically unsaturated carboxylic acids or their amides. Particularly preferred ethylenically unsaturated structural units are acryloyl and methacryloyl groups such as acrylamido and methacrylamido and, in particular, acryloxy and methacryloxy. Radiation-curable in the sense of the disclosure means that the primer composition can be at least partially polymerized induced by electromagnetic radiation of a suitable wavelength, such as UV or electron radiation.

The use of radiation-curable primers based on urethane acrylates enables in a particularly advantageous manner, for an application of the decoration immediately subsequent to the application and the radiation-induced curing of the primer layer, for example by means of digital printing technology. In this case, the primer layer ensures good adhesion of the applied decoration to the carrier surface coated with the primer. Here, urethane acrylates have the advantage of good adhesion both to the carrier material and the decorative layer, i.e. the decoration paint or ink. This is due, among other things, to the polymerization reactions occurring with this type of polymer, in which, on the one hand a radiation-induced radical polymerization of the OH groups, and on the other hand post-curing of the polymer via the NCO groups occurs. This results in that after radiation-induced curing, a tack-free and further processable surface is obtained immediately, while the final properties of the primer layer are also influenced by the NCO group-based post-curing and provide for a secure bond to the carrier material. In addition, the post-curing that occurs ensures that a sufficient layer stability is also achieved in less or not exposed areas of the carrier. In this way, the method according to the disclosure can also be used in particular to reliably apply a primer layer onto pre-structured carriers, i.e. carriers whose surface already have a three-dimensional structure, thus ensuring that the subsequently applied decoration is firmly bonded to the carrier.

In the method according to the disclosure, the primer can be applied preferably by means of rubber rollers, a pouring machine or by spraying onto the carrier plate passing through the roller assembly. It is also possible to apply the primer downstream the roller assembly but prior to the application of the decoration. Preferably, the primer is applied in an amount between $\geq 1$ g/m$^2$ and $\leq 100$ g/m$^2$ preferably between $\geq 10$ g/m$^2$ and $\leq 50$ g/m$^2$, in particular between $\geq 20$ g/m$^2$ and $\leq 40$ g/m$^2$. Following the application of the primer onto the carrier surface, an irradiation with a radiation source of a suitable wavelength is carried out.

In addition to the use of a primer, it is possible to apply the decoration onto a decorative paper printable with a corresponding decoration, which can be provided for example by means of a resin layer as a bonding agent previously applied onto the carrier. Such a printing subsurface is suitable both for flexographic printing, offset printing and screen printing processes, and in particular for digital printing techniques, such as inkjet processes or laser printing processes. For the application of the resin layer, it can preferably be provided that a resin composition is applied which comprises as resin component at least one compound selected from the group consisting of melamine resin, formaldehyde resin, urea resin, phenolic resin, epoxy resin, unsaturated polyester resin, diallyl phthalate or mixtures thereof. The resin composition may, for example, be applied in an amount between $\geq 5$ g/m$^2$ and $\leq 40$ g/m$^2$, preferably $\geq 10$ g/m$^2$ and $\leq 30$ g/m$^2$. Furthermore, a paper or nonwoven fabric having a grammage between 30 g/m$^2$ and $\leq 80$ g/m$^2$, preferably between $\geq 40$ g/m$^2$ and $\leq 70$ g/m$^2$, can be applied onto the plate-shaped carrier.

In the frame of a preferred embodiment of the method at least the application of the decoration subsurface onto a sub-region of the carrier in method step d) can take place upstream of the last roller of the roller assembly of method step c). For the formation of a particularly intimate adhesion between the decoration subsurface and the carrier, it has been found to be particularly suitable that the finish-sizing rollers are used not only to set the carrier height but also to apply and mechanically fix the decoration subsurface. This measure enables to realise a particularly efficient process, wherein in particular the drying of the decoration subsurface can also be accelerated, since the carrier has higher temperatures at this point in the process. Thus further mechanical components can be saved and the temperature control during cooling can be optimized. A total amount of heat to be dissipated from the material can be reduced, for example, by the heat capacity of the decoration subsurface.

In a further, preferred embodiment of the method, the roller assembly can include at least four further finish-sizing rollers in addition to the main roller pair, wherein one of the roller nips of the finish-sizing rollers is driven isobarically. In contrast to the mode of operation with constant nip thicknesses between the finish-sizing rollers, it has proved particularly advantageous for the surface properties of the carriers that at least one of the nips is operated isobarically, i.e. with constant force acting on the carrier. This makes it possible to achieve very fast process times while maintaining the smoothest possible carrier surface. In the sense of the disclosure, isobaric operation means that, by controlling the roller spacings, the force acting on the carrier in the roller nip during the production of the carrier fluctuates by less than 10%, preferably by less than 5%, furthermore preferably by less than 2.5%. The forces for producing a carrier can be measured, for example, by means of a force sensor at or in the roller, or else by means of one or more force sensors in the carrier material.

Within a preferred aspect of the method, the main and the finish-sizing rollers may be configured to be temperature controlled and the temperature controlled surface area of the finish-sizing rollers may be greater by a factor of greater than or equal to 1.1 up to less than or equal to 2.5 compared to the main rollers. In addition to the mechanical treatment of the melted polymer mass, the roller assembly can also be used for simultaneous thermal treatment of the carrier. The thermal treatment can in principle consist of partial heating or partial cooling of the carrier. Advantageously, the melted material is cooled by the rollers at the roller surface. This can be achieved in that, for example, the individual rollers are provided in the inside with a supply of heat transfer media, such as a cooling liquid. It is also advantageous that the surface temperatures of the individual rollers of the roller assembly can be controlled separately. This can contribute to a particularly reproducible and gentle forming and cooling process. The above-mentioned ratio of the cooling surfaces between the main and finish-sizing rollers has proven to be particularly suitable for obtaining particularly mechanically low-stress decorated panels with particularly few air inclusions. Without being bound by theory, the higher-quality decorations result from the amount of heat dissipated in a controlled manner in the individual steps, which is also proportional to the surface area of the roller pairs. Within this range, it is also possible to realise very high web speeds and a particularly efficient expulsion of air inclusions from the carriers. Furthermore, the individual roller temperatures, and consequently also the cooling rates achievable therewith, can be selected as a function of the mechanical force exerted on the carrier. Larger forces, for example due to high compressions of the carrier material, can be accompanied by a higher temperature gradient between the roller and the carrier material, so that overall a mechanically less stressed carrier is obtained.

Moreover, according to the disclosure, a device for producing a decorated wall or floor panel is provided, wherein the device comprises means for carrying out the method according to the disclosure. For the advantages of the device according to the disclosure, reference is explicitly made to the advantages of the method according to the disclosure. A preferred embodiment for the device may comprise a temperature-controllable screw extruder and a slot die with variable profile. Furthermore, the device may comprise temperature-controllable and, in particular, coolable rollers. The individual rollers can be moved relative to one another in their positions in the production process and, consequently, the roller nips formed between the rollers can also be changed in their dimensions. Preferably, at least one larger main roller pair and several, preferably at least 3, further preferably 4, further preferably 5, smaller finish-sizing rollers can be used for forming and finish-sizing the carrier. The rollers can respectively be configured to be separately adjustable in their temperatures. Downstream the roller assembly, the device according to the disclosure can further include means for applying further layers, such as, for example, a decoration subsurface, a decoration and/or a wear protection layer. The means for applying these layers can be arranged downstream of the finish-sizing rollers. Preferably, the decoration is applied downstream of the roller assembly via a direct printing process. The application of a decoration protective coating can, for example, be carried out by laminating under pressure or by brushing or by coating with a doctor blade a liquid or pasty protective coating compound. The device may also comprise further means for final cooling the carrier. It is also possible that the device also comprises further means for recycling the heat dissipated from the carrier to the product cycle. This can be done, for example, via heat exchangers. The recovered waste heat can be used, for example, for temperature control of the extruder. In addition, the device can comprise further means for mechanical processing the carrier, for example for special profiling the carrier edges. Furthermore, the device may comprise further means for subdividing the extruded plate into smaller panels of substantially equal length. This subdividing or cutting may be carried out for example by use of a saw. To this end, for example, circular or band saws may be suitable. However, it is also possible for the extruded and decorated panel to be divided into smaller panels by other physical means, such as a laser.

Further, according to the disclosure a wall or floor panel produced according to the method according to the disclosure is provided. For the advantages of the wall and floor panels according to the disclosure, explicit reference is made to the advantages of the method according to the disclosure and to the advantages of the device according to the disclosure. In particular, it should be pointed out that panels can be obtained with very high line speeds by use of the method according to the disclosure, which are characterized by particularly smooth surfaces and a low air content within and in the form of pores at the surface of the panels. The number and size of surface defects caused by air can be significantly reduced. The temperature control and the mechanical treatment also result in very low-stress carriers. The method and the device are moreover suited for processing different materials.

In a particularly advantageous manner, the carrier material can comprise or consist of wood-polymer materials (Wood Plastic Composite, WPC). Here, for example, a wood and a polymer may be suitable, which may be present in a ratio of 40/60 to 70/30, for example 50/50. The polymer components may be, for example, polypropylene, polyethylene or a copolymer of the two aforementioned materials. Such materials offer the advantage that they can already be formed into a carrier in the method described above at low temperatures, such as in a range from 180° C. to 200° C., so that a particularly effective process control, for example with exemplary line speeds in a range of 6 m/min, can be enabled. For example, a WPC product with a 50/50 distribution of wood and polymer components with an exemplary product thickness of 4.1 mm can be obtained, which can enable a particularly effective production process.

In a preferred embodiment of the wall or floor panel, the panel can comprise greater than or equal to 50 wt.-% and less than or equal to 100 wt.-% of a WPC material or a PVC material. Further, it may be particularly advantageous that the carrier material comprises or consists of a PVC-based material. Such materials, too, can serve in a particularly advantageous manner for high-quality panels, which can also be used without problems in damp rooms, for example. Moreover, PVC-based carrier materials are also suitable for a particularly effective production process, since here line speeds of 8 m/min can be possible at an exemplary product thickness of 4.1 mm, which can enable a particularly effective production process. Moreover, such carriers, too, exhibit an advantageous elasticity and water compatibility, which can lead to the aforementioned advantages.

In the case of plastic-based panels as well as WPC-based panels, mineral fillers can be advantageous. Here, particularly suitable are, for example, talc or also calcium carbonate (chalk), aluminum oxide, silica gel, quartz flour, wood flour, gypsum. For example, chalk can be provided in a range from ≥30 wt.-% to ≤70 wt.-%, wherein the fillers, in particular by means of the chalk, in particular the slip of the carrier can be improved. Moreover, they may be colored in a known manner. In particular, it may be provided that the plate material comprises a flame retardant.

In a preferred embodiment of the wall or floor panel, the carrier material of the panel may comprise a matrix material and a solid material, wherein the matrix material is present in an amount, based on the carrier material, from ≥25 wt.-% to ≤55 wt.-%, in particular from ≥35 wt.-% to ≤45 wt.-%, and wherein the solid material is present in an amount, based on the carrier material, from ≥45 wt.-% to ≤75 wt.-%, in particular from ≥55 wt.-% to ≤65 wt.-%, and wherein the matrix material and the solid material together are present, based on the carrier material, in an amount from ≥95 wt.-%, in particular ≥99 wt.-%, wherein the solid material is formed, based on the solid material, in an amount of at least 50 wt.-%, in particular at least 80 wt.-%, in particular at least 95 wt.-%, by a solid composition consisting of at least a first layered silicate powder and a second layered silicate powder, and the matrix material is formed, based on the matrix material, in an amount of at least 50 wt.-%, in particular at least 80 wt.-%, in particular at least 95 wt.-%, by a plastic composition consisting of a homopolymer and at least one first copolymer and one second copolymer. Surprisingly, it has been found that the method according to the disclosure can also be used to process compositions of several polymers which are difficult to process, in particular those which are difficult to smooth at the surface and which are filled with silicates. The surfaces can be processed at high line speeds by means of the method according to the disclosure and the smoothness obtained at high speeds is comparable to or better than that of prior art methods.

In detail, the carrier material comprises a solid material and a matrix material. It is envisaged that the matrix material is present in an amount, based on the carrier material, from ≥25 wt.-% to ≤55 wt.-%, in particular from ≥35 wt.-% to ≤45 wt.-%. It is further provided that the solid material is present in an amount, based on the carrier material, from ≥45 wt.-% to ≤75 wt.-%, in particular from ≥55 wt.-% to ≤65 wt.-%.

Depending on the desired field of application and the desired properties of the panel, the proportions of matrix material and solid material can be selected. This enables a good adaptability to the desired field of application. In principle, however, it may be preferred that the proportion of the solid material is greater than or equal to the proportion of the matrix material.

It is further provided that the matrix material and the solid material are present together, based on the carrier material, in an amount from ≥95 wt.-%, in particular ≥99 wt.-%.

In other words, it may be provided that, in addition to the solid material and the matrix material, further substances are present in the carrier material only in an amount, based on the carrier material, of <5 wt.-%, preferably of <1 wt.-%. Thus, it may be advantageous that the carrier material consists to a large extent of the solid material and the matrix material. Particularly preferably, it may be provided that the matrix material and the solid material are present together, based on the carrier material, in an amount of 100 wt.-%, thus, the carrier material consists of the matrix material and the solid material.

By limiting the materials of the carrier material and thus by using a small number of materials to produce the carrier, the carrier can be produced particularly cost-efficiently. Furthermore, the process control of the production of a carrier or a panel can be very simple, so that the production can also be simple and inexpensive.

In detail, it is further provided that the solid material is formed to at least 50 wt.-%, in particular at least 80 wt.-%, in particular at least 90 wt.-%, based on the solid material, from a solid composition consisting of at least one first layered silicate powder and one second layered silicate powder.

In this context, layered silicate powder is understood to mean, in a manner known per se, a powder of a layered silicate. A layered silicate is a known term for minerals from the group of silicates, the silicate anions of which are usually arranged in layers.

For example, layered silicates are understood to mean minerals from the mica group, the chlorite group, the kaolinite group and the serpentine group.

Thus, the solid material is advantageously formed at least by a major part of the mineral material layered silicate, whereby this material can be used, for example, in powder form or can be present in the carrier material in the form of particles. In principle, the solid material can consist of a powdered solid.

Layered silicates offer the advantage that they can allow the production of a carrier with good mechanical properties and, at the same time, can be easily processed into corresponding powders due to their layered structure.

In one embodiment of the disclosure, the first layered silicate powder or the second layered silicate powder may comprise talc. Talc is understood to mean, in a manner known per se, a magnesium silicate hydrate, which may for example have the chemical formula $Mg_3[Si_4O_{10}(OH)_2]$. In a further embodiment of the disclosure, the first layered silicate powder and the second layered silicate powder may comprise talc. In a further preferred embodiment, the first layered silicate powder and the second layered silicate powder may consist of at least 80 wt.-%, more preferably at least 95 wt.-%, of talc.

Talc in particular offers the advantage of enabling a particularly gentle production of the carrier, since it can be embedded into the matrix material without any problems and thus does not exert any abrasive effect on press units used.

In particular, a mixture of a homopolymer and a first copolymer and a second copolymer can enable particularly advantageous properties for the matrix material. Materials of this type also offer the advantage that they can be formed into a carrier at low temperatures, such as in a range from ≥180° C. to ≤200° C., in the method described above, so that a particularly effective process control, for example with exemplary line speeds in a range of 6 m/min, can be achieved. The effective process control can be achieved in particular in that the carrier material has an advantageous mass flow rate. Due to the mixture of a homopolymer and a first copolymer and a second copolymer, for example, it can be achieved that the carrier material has a mass flow rate from ≥20 g/10 min to ≤30 g/10 min, preferably from ≥24 g/10 min to ≤26 g/10 min. In particular, the use of at least two copolymers can be of advantage, because thereby improved elastic properties of the produced carrier can be achieved. In particular, it can be achieved that panels produced by use of the carrier material have an advantageous flexural modulus. For example, a panel can be provided on the basis of the carrier material which has a flexural modulus from ≥3000 MPa to ≤4000 MPa, preferably from ≥3400 MPa to ≤3600 MPa. It can furthermore be achieved that panels produced by use of the carrier material have an advantageous flexural strength. For example, a panel can be provided on the basis of the carrier material which has a flexural strength from ≥30 MPa to ≤34 MPa, preferably from ≥31 MPa to ≤33 MPa. Furthermore, it can be achieved that panels produced by use of the carrier material have an advantageous bending strain. For example, a panel can be provided on the basis of the carrier material which has a bending strain from ≥2.0% to ≤2.8%, preferably from 2.3% to 2.5%.

It may preferably be provided that the homopolymer, the first copolymer and the second copolymer comprise polypropylene. Polypropylene is particularly suitable as a matrix material, since on the one hand it is available at low cost and further, as a thermoplastic, it has good properties as a matrix material for embedding the solid material.

In a preferred embodiment of the wall or floor panel, the panel may comprise a multilaminar plastic carrier material comprising a plurality N of layer sequences A-B-A, wherein layer A comprises a first thermoplastic and layer B comprises a second thermoplastic, and wherein the first thermoplastic is a virginal plastic and the second thermoplastic is a recycled plastic, and wherein 250≥N≥2, preferably 200≥N≥3, preferably 125≥N≥4, even more preferably 100≥N≥5. It could be shown in a surprising manner that such a plastic carrier material can be produced by the method according to the disclosure at high line speeds and with high dimensional stability. In this case, the different layers can be deposited simultaneously as co-extrudate over several nozzles or deposited one after the other and processed by the method according to the disclosure. Such wall, ceiling or floor panels exhibit an improved moisture resistance, in particular with reduced moisture- or heat-induced swelling, as well as good mechanical properties and an improved machinability. In addition, the plastic carrier material according to the disclosure is ecologically advantageous, since it can be made from a significant proportion of recycled plastic and is thus resource-saving. Moreover, A-B-C-B-A composites are suitable for this purpose, for example as a variant paint, filler, foam, in-house recycling, or polymer composites.

For example, the recycled thermoplastic of layer B may comprise an amorphous polyethylene terephthalate (PET). Polyethylene terephthalate (PET) is produced in large quantities in the packaging industry, where it is used in particular for food packaging and beverage bottles. Since the highest standards have to be met in the food packaging sector, recycling of PET is generally only possible to a limited extent. Despite the recycling processes now available, such as the URRC (United Resource Recovery Corporation) process, large quantities of PET are not recycled locally but exported for the production of synthetic fibers. Here, the method according to the disclosure offers a further possible use for recycled PET.

Preferably, the proportion of recycled polyethylene terephthalate in layer B can be in a range between ≥10 wt.-% and ≤100 wt.-%, based on the polymer proportion of the layer B. Particularly preferably, the amount of recycled polyethylene terephthalate in layer B can be in a range between ≥15 wt.-% and ≤90 wt.-%, in particular from ≥20 wt.-% and ≤80 wt.-%, based on the polymer content of layer B.

In addition to the recycled polyethylene terephthalate, a virginal polyethylene terephthalate can be provided in layer B. Here, the proportion of virginal PET can be in the range between ≥0 wt.-% and ≤90 wt.-%, based on the polymer content of layer B. Particularly preferably, the proportion of virginal polyethylene terephthalate in layer B can be in a range between ≥10 wt.-% and ≤80 wt.-%, in particular from ≥15 wt.-% and ≤75 wt.-%, based on the polymer proportion of layer B. By providing virginal PET in layer B, improved bonding to layers A can be achieved.

In a preferred embodiment, in particular PET-based polymer compositions can be subjected to a separate annealing/tempering process within the build-up. The annealing/tempering process helps to relieve stresses present in the plate due to the finish-sizing process and thus improves the dimensional stability. The subsequent heat treatment can be carried out, for example, in the form of further tempering rollers around which the web-film extrudate is passed. Further annealing options are temperature-controlled circulating air lines or heated water baths, wherein the annealing temperature should be selected such that it does not lead to post-crystallization of the polymer mass.

According to a further embodiment of the disclosure, it may be provided that the layer B comprises, in addition to the thermoplastic, a filler, wherein the filler is preferably selected from the group consisting of chalk, non-asbestos silicate, preferably magnesium silicate, wood flour, expanded clay, volcanic ash, pumice, aerated concrete, in particular inorganic foams, cellulose or an expanding agent.

Preferably, the proportion of filler can be in a range between ≥1 wt.-% and ≤60 wt.-%, in particular in a range between ≥5 wt.-% and ≤50 wt.-%, based on the total mass of the material forming layer B.

In an advantageous manner, the addition of fillers makes it possible to adjust the material properties of the multilaminar plastic carrier material, such as its specific weight or also its calorific value. The latter is particularly relevant to the question of the fire load introduced into a building by a wall, ceiling or floor covering formed on the basis of a corresponding multilaminar plastic carrier. In general, depending on the desired field of application and the desired properties of a panel formed on the basis of a multilaminar plastic carrier material according to the disclosure, the proportions of thermoplastic material or filler material can be selectable. This can enable a good adaptability to the desired field of application.

Particularly preferably, it can be provided that a layered silicate, such as talc, is provided as a filler in layer B. The term talc is understood to mean in a manner known per se a magnesium silicate hydrate which, for example, may have the chemical formula $Mg_3[Si_4O_{10}(OH)_2]$. Thus, the solid fraction is advantageously formed at least by a major part of the mineral substance talc, wherein this substance can be used, for example, in powder form or can be present in the carrier material in the form of particles. In principle, the solid material can consist of a powdery solid.

In a preferred embodiment of the wall or floor panel, the panel may comprise wood and/or chalk particles with a particle size between ≥0 µm and ≤600 µm and a particle size distribution $D_{50}$ of ≥400 µm. According to a particularly preferred embodiment of the disclosure, the carrier material consists of a blend of a PE/PP block copolymer with wood. Here, the proportion of the PE/PP block copolymer as well as the proportion of the wood may be between ≥45 wt.-% and ≤55 wt.-%. Furthermore, the carrier material can contain between ≥0 wt.-% and ≤10 wt.-% of further additives such as flow aids, thermostabilizers or UV stabilizers. Here, the particle size of the wood is between ≥0 µm and ≤600 µm with a preferred particle size distribution $D_{50}$ of ≥400 µm. Here, the particle size distribution is based on the volumetric diameter and refers to the volume of the particles. Particularly preferably, the carrier material is provided as a granulated or pelletized pre-extruded mixture of a PE/PP block copolymer with wood particles of the specified particle size distribution. The granules and/or the pellets can preferably have a particle size in a range from ≥400 µm to ≤10 mm, preferably ≥600 µm to ≤10 mm, in particular ≥800 µm to ≤10 mm.

In order to determine the particle size distribution, generally known methods such as laser diffraction can be used, by means of which particle sizes in the range of a few nanometers up to several millimeters can be determined. By means of this method, it is also possible to determine the size distributions of the feedstocks and thus also the $D_{50}$ or $D_{10}$ values, wherein the quantiles indicate those particle sizes from which 50% or 10% of the measured particles are smaller than the specified value.

With regard to further technical features and advantages of the wall or floor panel, reference is hereby explicitly made to the description of the method, the device and the figures.

The disclosure is further explained below with reference to the figures as well as an exemplary embodiment.

Further areas of applicability will become apparent from the description provided herein. The description and specific examples in this summary are intend-ed for purposes of illustration only and are not intended to limit the scope of the pre-sent disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
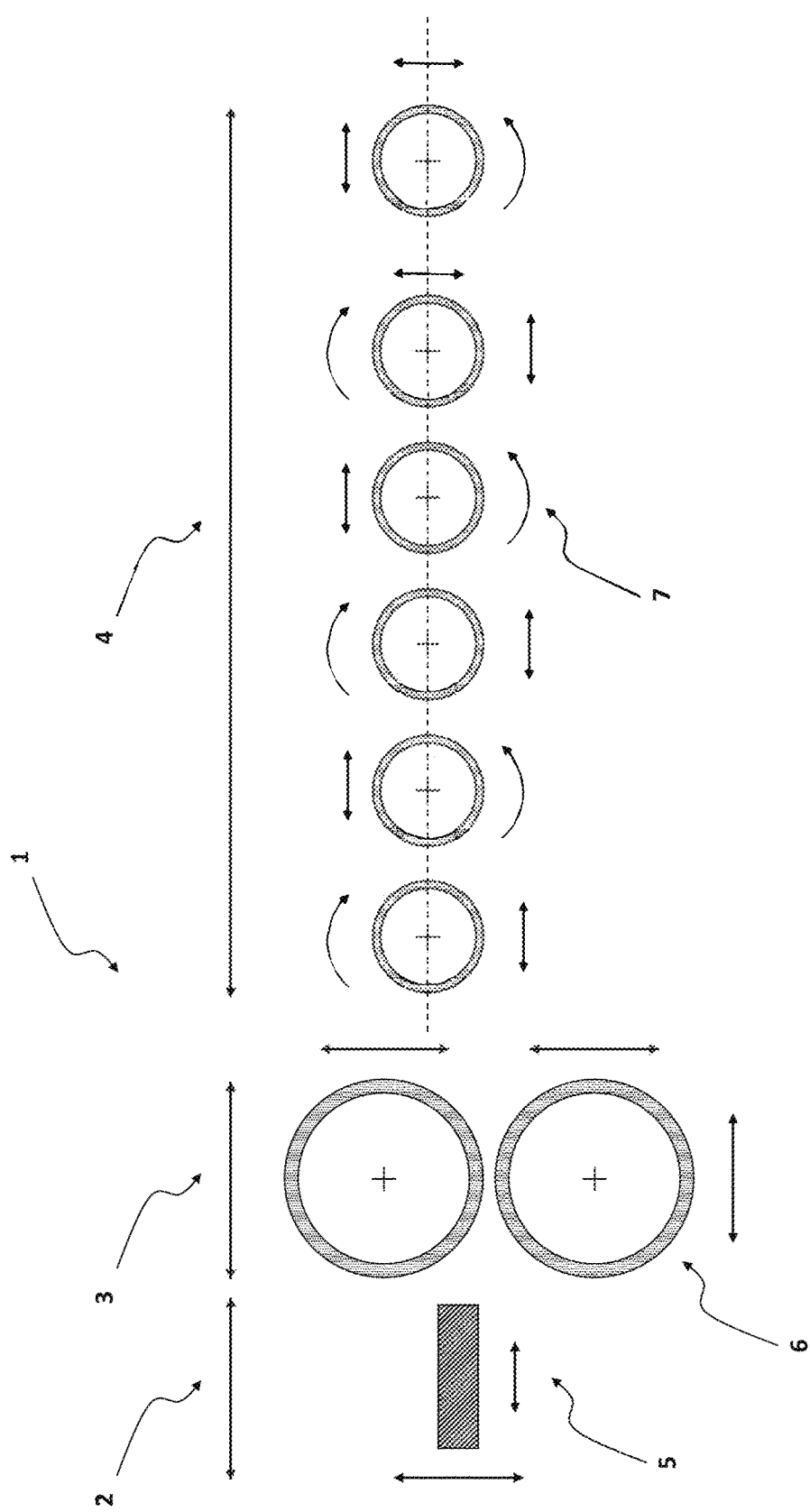
FIG. 1 shows schematically a cross-sectional view of an apparative design for carrying out the method according to the disclosure.

The device 1 according to FIG. 1 is suitable for a method for producing a decorated wall or floor panel. FIG. 1 shows in cross-section the possible structure of the device for producing decorated panels 1, wherein in this figure in particular the units of an extrusion device 2 with a die 5, a main roller pair a finish-sizing roller assembly 4 are shown. In this embodiment 6 finish-sizing rollers 7 are shown, which can each be controlled independently of one another in their X- and Y-positions. A possible sequence of directions of rotation for the individual finish-sizing rollers 7 is indicated by the arrows. The device 1 schematically shows the extrusion device 2, which is divided into an extruder (not shown separately) for thermal treatment of polymer granules and the actual die 5. The melted polymer strand emerging from the die can be fed through the nip of the main roller assembly 3 with the individual main rollers 6. The height of the roller nip between the two main rollers 6 can be variably adjusted by moving the main rollers 6 to each other. After the melted polymer mass has undergone initial shaping and, if necessary, cooling by the main roller nip, the strand is transferred to the finish-sizing roller assembly 4. In the finish sizing roller assembly 4, the melted polymer strand is further reduced in height or finish-sized. The strand is passed through the nips between the individual finish-sizing rollers 7 and changed in its height as a function of the nip distance. Here, the individual finish-sizing rollers 7 do not always have to be in the same distance from each other, so that different nip heights can be set between the finish-sizing rollers 7 during the process. The finish-sizing rollers 7 also do not have to have the same height, but can also be arranged offset to each other. This can change the mechanical stretching properties of the melted polymer strand. After finish-sizing by the main roller assembly 3 and the individual finish-sizing rollers 7, the finish-sized and smoothed material can be provided with a decoration via a printing unit (not shown). Furthermore, the decorated surface of the panel can be provided with one or, if necessary, further layers, such as, for example, protective coatings.

Figure 2:
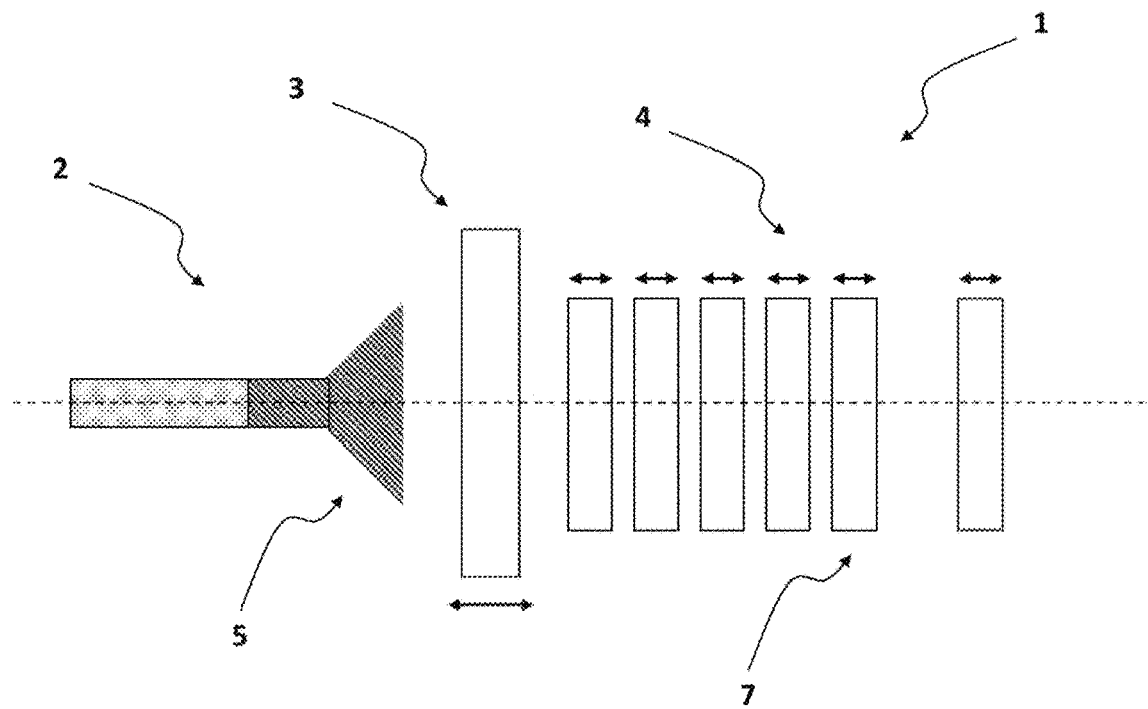
FIG. 2 shows schematically a plan view of an apparative design for carrying out the method according to the disclosure.

FIG. 2 shows a plan view of a device 1 according to the disclosure. The extrusion device 2 shown with extruder and die transfers a melted polymer strand to the main roller assembly 3. The distance between the main roller assembly 3 and the extrusion device 2 is variable and can be varied, for example by means of controlled electric motors. After the melted polymeric mass has passed through the nip of the main roller assembly 3, the carrier changed in its height and optionally already cooled somewhat by the main roller assembly 3 is guided into the finish-sizing roller assembly 4. The finish-sizing roller assembly 4 consists of the individual finish-sizing rollers 7, which form nips between them through which the finish-sized carrier is passed and further formed. The individual finish-sizing rollers 7 can be moved as a whole or each separately in their relative position to one another. Furthermore, it is possible for the individual finish sizing rollers 7 to be controlled in their roller surface temperature as a whole or each separately.

Figure 3:
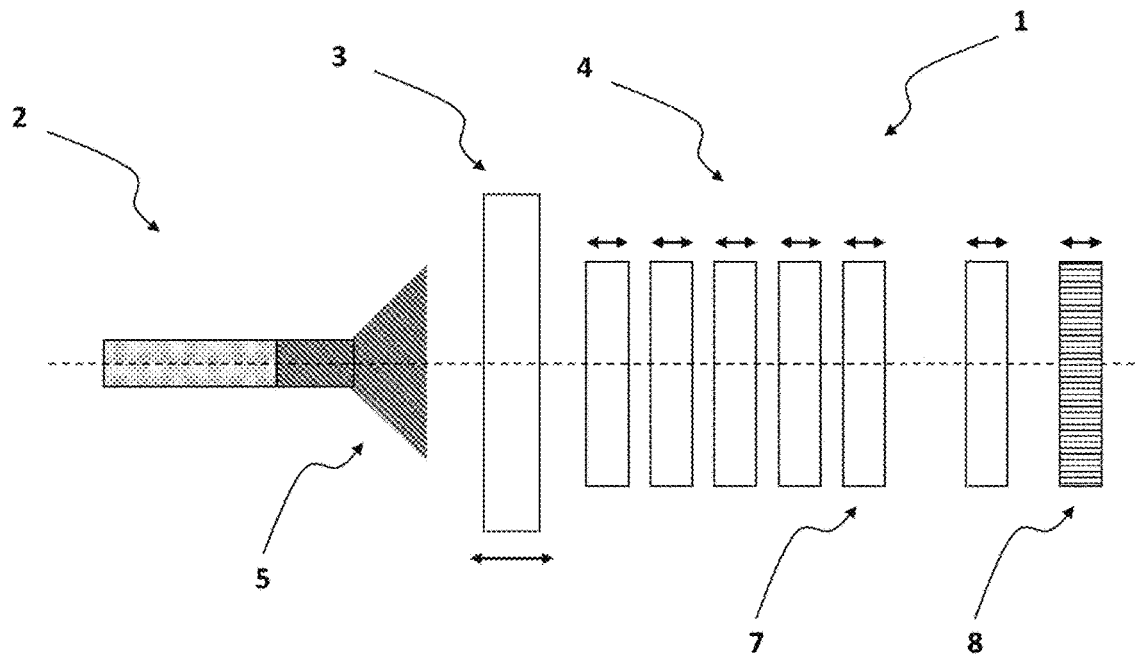
FIG. 3 shows schematically a plan view of an apparative design for carrying out the process according to the disclosure.

FIG. 3 shows essentially the embodiment of FIG. 2, wherein here additionally the decoration assembly 8 is shown. The decoration assembly 8 is arranged downstream of the finish-sizing rollers 7 and applies a decoration onto the finish-sized and optionally cooled carrier. The decoration assembly 8 may, for example, comprises an inkjet printer and a further unit which applies a further protective coating at least partially onto the printed decoration. Furthermore, it is possible that no printer is used, but rather a decoration already applied to a carrier, which is deposited on the finished-sized carrier via a roll, for example. In addition, at this point the carrier can be further cooled, profiled or mechanically processed, for example at the long sides.

Figure 4:
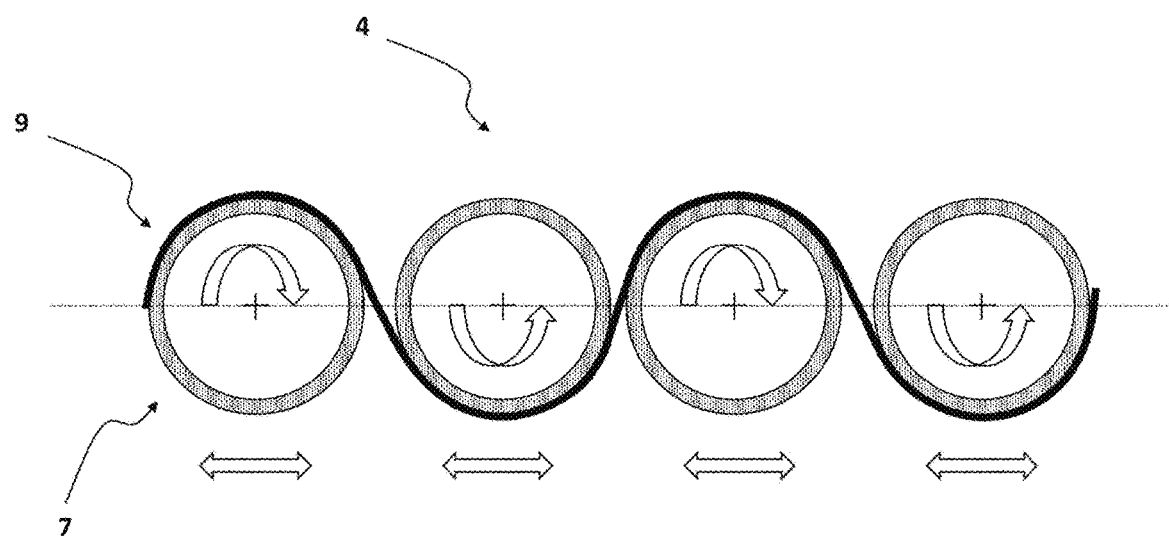
FIG. 4 shows schematically the guidance of melted polymer material through a finish-sizing roller assembly.

FIG. 4 shows a possible guidance of the melted polymeric carrier 9 through the finish-sizing roller nips. By depositing on the finish-sizing rollers 7, the melted polymeric carrier 9 can be cooled, for example. In this assembly of the individual finish-sizing rollers 7, the thickness of the melted polymeric carrier 9 is more likely to be changed by the mechanical tension of the rollers. The individual finish-sizing rollers 7 are too far apart from each other to enable that the melted polymeric carrier 9 experiences direct squeezing or compression through the nip between the finish-sizing rollers 7.

Figure 5:
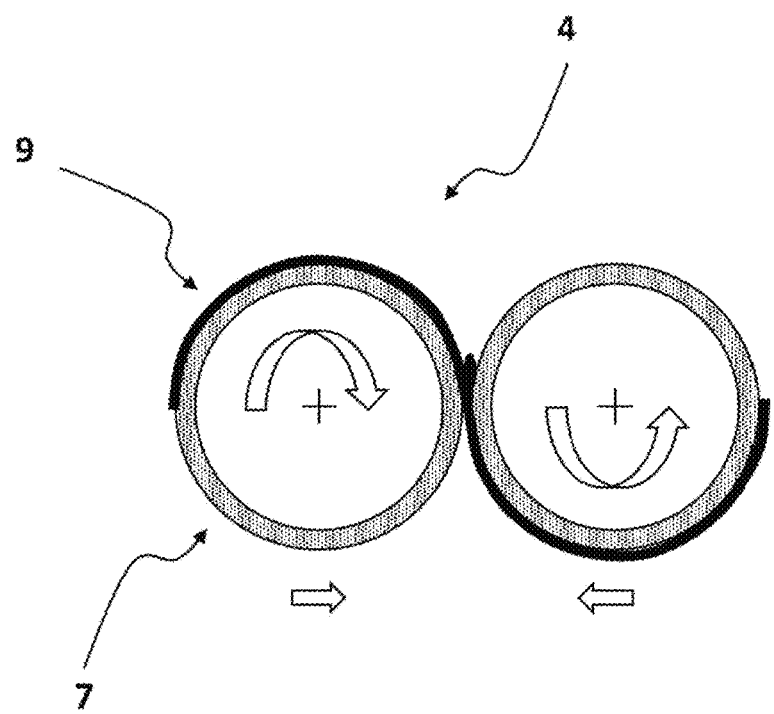
FIG. 5 shows schematically the guidance of melted polymeric material through a finish-sizing roller assembly.

FIG. 5 shows a similar finish-sizing roller assembly 4 with two finish-sizing rollers 7 as in FIG. 4, wherein the finish-sizing rollers 7 are closer together and form a nip which is smaller than the thickness of the melted polymeric carrier 9. Due to the fact that the melted polymeric carrier 9 is at least partially thicker than the finish-sizing nip, the height of the melted polymeric carrier 9 is levelled by the finish-sizing nip between the finish-sizing rollers 7.

Figure 6:
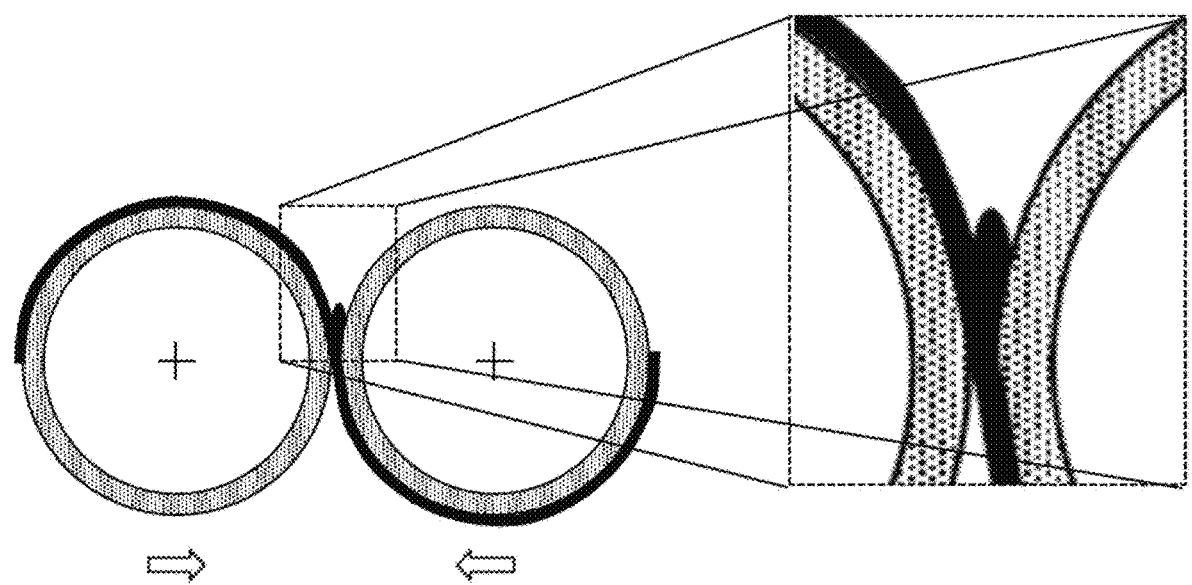
FIG. 6 shows schematically the guidance of melted polymer material through a finish-sizing roller assembly with an enlarged portion.

FIG. 6 shows once again the finish-sizing roller section of FIG. 5 together with an enlarged section. In the enlarged section, it can be seen that excess material of the melted polymeric carrier 9 is pushed up at the beginning of the finish-sizing nip. As a result, the height of the melted polymeric carrier 9 is adapted to the height of the finish-sizing nip. The distance between the finish-sizing rollers 7 allows the height of the finish-sizing nip and thus the height of the carrier to be adjusted. According to the disclosure it is advantageous that the finish sizing rollers 7 are so close together that as little ambient air as possible can get between the finish-sizing rollers 7 and the melted polymeric carrier 9. The narrow nip ensures that as little additional air as possible is forced into the carrier surface. The latter can contribute to an improved finish-sized carrier surface.

Figure 7:
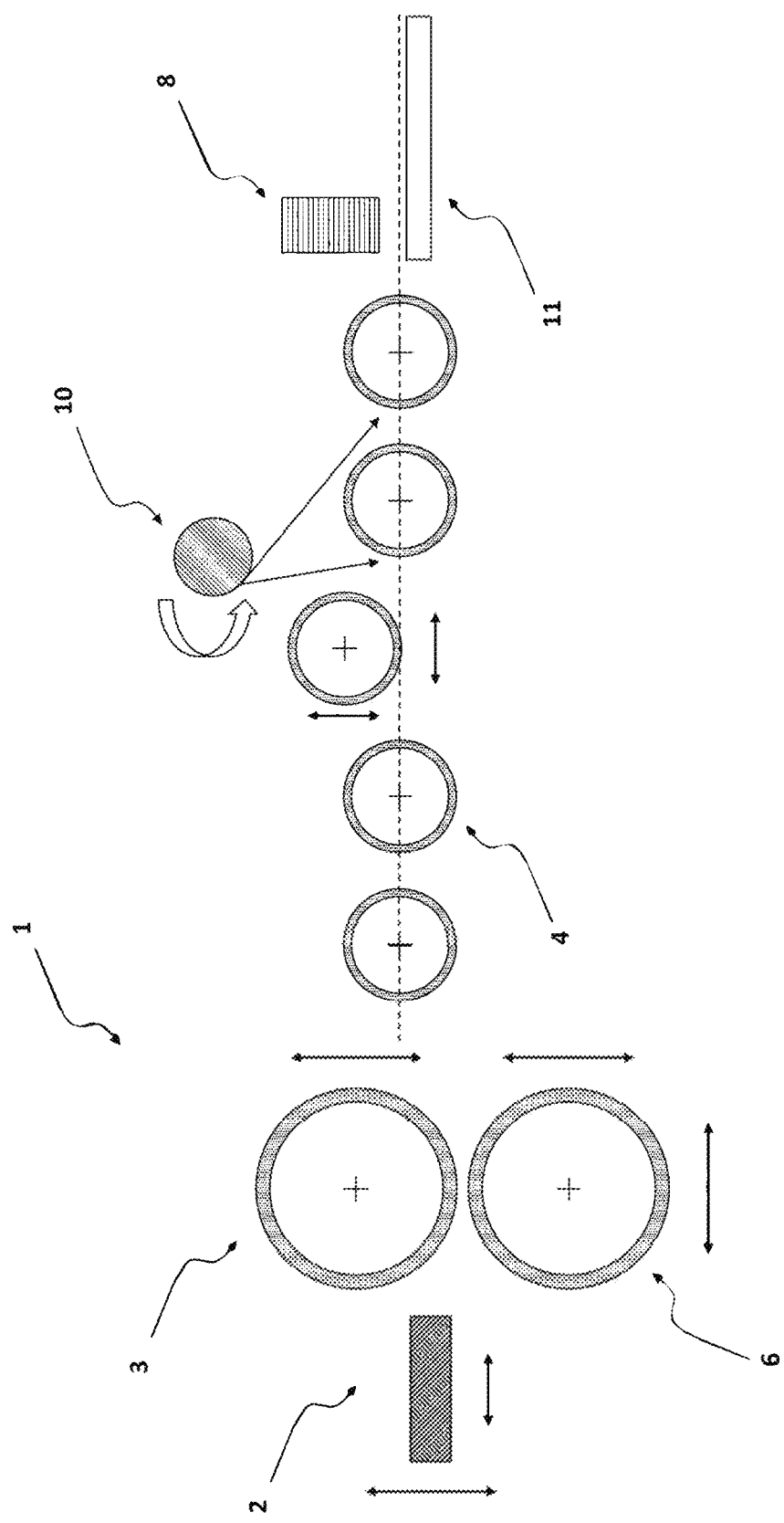
FIG. 7 shows schematically a cross-sectional view of one way of carrying out the method according to the disclosure.

FIG. 7 shows a further embodiment of a design of a device 1 for producing decorated panels according to the disclosure. The device 1 also comprises an extrusion device 2, for example with a slot die and an extruder. The melted polymeric mass is extruded through the die and passes via the nip of the main rollers 3 to the finish-sizing roller assembly 4 comprising the individual finish-sizing rollers 7. In this figure, it is shown that the individual finish-sizing rollers 7 do not necessarily have to be at the same height relative to one another. By deflecting a finish-sizing roller 7 in height, for example, the mechanical forces and also the cooling properties over an air gap can be changed. Furthermore, the figure shows that an additional layer 10 can be applied within the finish-sizing roller assembly 4 comprising the different finish-sizing rollers 7, which is available, for example, as a coiled material and can be applied at different points of the finish-sizing roller assembly 4. The additional layer can be a primer or a decoration subsurface, for example. By applying the additional layer within the finish-sizing roller assembly 4, an additional mechanical treatment of the layer can be carried out by the finish-sizing rollers 7, which can lead to a better adhesion of the additional layer to the carrier. Furthermore, it can be ensured in this way that the application of the additional layer does not cause the carrier to deviate in height from the desired dimensions, since both the carrier and the additional layer pass through the last finish-sizing nip. After the application of the additional layer, a decoration and a protective coating can be applied onto the finish-sized carrier by the decoration assembly 8, at least partially. Furthermore, it is possible that the carrier is either further tempered/cooled in a defined manner or is mechanically post-processed via further means 11. Suitable further means 11 for this purpose may be cooling or tempering surfaces or mechanical milling machines for further profiling, for example of the carrier edges The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for producing a decorated wall or floor panel, comprising the method steps:

a) providing a melted polymer mass;
b) extruding the melted polymer mass through a die;
c) finish-sizing the melted polymer mass to form a carrier plate by means of an assembly of a plurality of rotatable rollers, wherein the individual rollers are arranged one behind the other and each individual roller forms with adjacent rollers at least one finish-sizing nip through which the melted polymer mass is passed, wherein the finish-sizing nip heights are variably adjustable by a horizontal and/or vertical movement of individual rollers during the production process;
d) applying a decoration reproducing a decoration template onto at least one sub-region of the at least partially finish-sized carrier; and
e) applying a protective coating to at least a sub-region of the decoration, wherein the finish-sizing in method step c) is carried out by use of at least one main roller pair consisting of two rollers with a larger diameter and at least three finish-sizing rollers arranged one behind the other with a smaller diameter compared to that of the main roller pair, wherein the height of the finish-sizing nip of the main roller pair $H_H$ differs from the heights of the finish-sizing nips of the finish-sizing rollers $H_K$ by greater than or equal to 10% and less than or equal to 50%, and wherein the height of the last and/or the penultimate finish-sizing nip is selected such that the carrier is compressed in its height by a factor of less than or equal to 10% and greater than or equal to 3%.

2. The method according to claim 1, wherein method step d) prior to the application of the decoration additionally comprises the application of a decoration subsurface onto at least a sub-region of the carrier.

3. The method according to claim 2, wherein at least the application of the decoration subsurface onto a sub-region of the carrier in method step d) takes place upstream of the last roller of the roller assembly of method step c).

4. The method according to claim 1, wherein the roller assembly comprises, in addition to the main roller pair, at least four further finish-sizing rollers, wherein one of the roller nips of the finish-sizing rollers is operated isobarically.

5. The method according to claim 1, wherein the main rollers and the finish-sizing rollers are equipped to be temperature-controlled and the temperature-controlled surface of the finish-sizing rollers is greater by a factor of greater than or equal to 1.1 up to less than or equal to 2.5 compared to that of the main rollers.

* * * * *